US012654231B2

(12) United States Patent
Kim et al.

(10) Patent No.: US 12,654,231 B2
(45) Date of Patent: Jun. 16, 2026

(54) CUTTING INSERT AND CUTTING TOOL ON WHICH SAME IS MOUNTED

(71) Applicant: KORLOY INC., Seoul (KR)

(72) Inventors: Sung Hun Kim, Cheongju-si (KR); Young Heum Kim, Cheongju-si (KR); Byung Hoon Min, Cheongju-si (KR)

(73) Assignee: KORLOY INC., Seoul (KR)

( * ) Notice: Subject to any disclaimer, the term of this patent is extended or adjusted under 35 U.S.C. 154(b) by 440 days.

(21) Appl. No.: 18/554,101

(22) PCT Filed: Feb. 17, 2022

(86) PCT No.: PCT/KR2022/002388
§ 371 (c)(1),
(2) Date: Oct. 5, 2023

(87) PCT Pub. No.: WO2022/234933
PCT Pub. Date: Nov. 10, 2022

(65) Prior Publication Data
US 2024/0367238 A1 Nov. 7, 2024

(30) Foreign Application Priority Data
May 6, 2021 (KR) ........................ 10-2021-0058406

(51) Int. Cl.
*B23B 27/16* (2006.01)
(52) U.S. Cl.
CPC ...... *B23B 27/1611* (2013.01); *B23B 27/1607* (2013.01); *B23B 2200/0476* (2013.01)

(58) Field of Classification Search
CPC ............. B23B 27/1611; B23B 27/1607; B23B 2200/0476; B23B 2200/0447;
(Continued)

(56) References Cited

U.S. PATENT DOCUMENTS 9,346,102 B2 * 5/2016 Selin ...................... B23B 27/005
9,630,256 B2 * 4/2017 Nada ...................... B23B 27/141
(Continued)

FOREIGN PATENT DOCUMENTS

JP 6241695 B2 12/2017

*Primary Examiner* — Lawrence Averick
(74) *Attorney, Agent, or Firm* — Rabin & Berdo, P.C.

(57) ABSTRACT

A cutting insert according to one embodiment of the present invention comprises an upper surface, a lower surface, a lateral surface, a cutting edge, and a fastening hole, wherein the cutting edge includes a main cutting edge, a nose R part connected to the main cutting edge, and a sub-cutting edge connected to the nose R part, the upper surface includes a land part adjacent to the cutting edge, an inclined surface downwardly inclined from the land part, and an upper surface bottom part extending from the inclined surface, first and second protrusion parts are formed respectively, in which the first protrusion part is connected to a main cutting edge land part and formed on a main cutting edge inclined surface at a portion at which a nose R part inclined surface ends and the second protrusion part is connected to a sub-cutting edge land part and formed on a sub-cutting edge inclined surface at a portion at which the nose R part inclined surface ends, and no protrusion is present on the nose R part inclined surface.

9 Claims, 12 Drawing Sheets

(58) Field of Classification Search
CPC ........ B23B 2200/321; B23B 2200/323; B23B
2200/3618; B23B 27/143
USPC ......................... 407/30; 82/157, 117; 142/56
See application file for complete search history.

(56) References Cited

U.S. PATENT DOCUMENTS

| | | | |
|---|---|---|---|
| 10,493,535 B2 * | 12/2019 | An ......................... | B23B 27/143 |
| 2013/0236257 A1 * | 9/2013 | Nada ................... | B23B 27/1607 |
| | | | 407/114 |
| 2015/0003923 A1 * | 1/2015 | Selin ..................... | B23B 27/143 |
| | | | 407/115 |
| 2019/0009345 A1 * | 1/2019 | An .......................... | B23B 27/22 |

* cited by examiner (a)

(b)

processing direction (h4>h1>h2>h3)

(θ1>θ2>θ3)

<B-B cross-sectional view>

E-E cross-sectional view

CUTTING INSERT AND CUTTING TOOL ON WHICH SAME IS MOUNTED

TECHNICAL FIELD

The present invention relates to a cutting insert and a cutting tool on which the cutting insert is mounted.

BACKGROUND ART

Generally, a cutting insert is fastened to a cutting tool mounted on a machine tool and used for cutting a workpiece such as a machine part and so on that is made of iron, non-ferrous metal, non-metal material, and so on.

Such a cutting insert includes an upper surface, a lower surface facing the opposite direction, a lateral surface joining the upper surface and the lower surface to each other, and a cutting edge forming a boundary between the upper surface and the lateral surface and cutting a workpiece.

Meanwhile, FIG. 12 shows a cutting insert disclosed in JP Patent No. 6241695. For reference, FIG. 12 corresponds to FIG. 1 of the Japanese Patent mentioned above.

A related cutting insert includes at least one cutting edge formed at an intersection between an inclined surface and a flank surface, and at least one ridge. The cutting edge includes a cutting edge part extending along a corner portion and a straight cutting edge part connected thereto. Further, the ridge rises on the inclined surface and extends from an inner inclined surface of the cutting edge part of the corner portion toward an inner inclined surface of the straight cutting edge part.

Meanwhile, in the related cutting insert, because the ridge is disposed at a position lower than the cutting edge, it has limitation in preventing the chips of high pressure generated in a processing unit from being long stretched while flowing toward the sub-cutting edge part. In addition, this structure also has a problem of insufficient supply of cutting oil from the outside to the processing unit, which results in low heat dissipation effect.

DETAILED DESCRIPTION OF INVENTION

Technical Problem

The present invention has been made to solve the problems described above, and it is an object of the present invention to provide a cutting insert that can prevent damage to the cutting edge by facilitating curling of the chips and also improve the processing lifetime by increasing heat dissipation, and a cutting tool on which the cutting insert is mounted.

Technical Solution

In order to achieve the objects mentioned above, a cutting insert according to an embodiment of the present invention is characterized by including an upper surface, a lower surface, a lateral surface, a cutting edge, and a fastening hole, in which the cutting edge includes a main cutting edge, a nose R part connected to the main cutting edge, and a sub-cutting edge connected to the nose R part, the upper surface includes a land part adjacent to the cutting edge, an inclined surface downwardly inclined from the land part, and an upper surface bottom part extending from the inclined surface, the land part includes a main cutting edge land part adjacent to the main cutting edge, a nose R part land part connected to the main cutting edge land part and adjacent to the nose R part, and a sub-cutting edge land part connected to the nose R part land part and adjacent to the sub-cutting edge, the inclined surface includes a main cutting edge inclined surface downwardly inclined from the main cutting edge land part, a nose R part inclined surface connected to the main cutting edge inclined surface and downwardly inclined from the nose R part land part, and a sub-cutting edge inclined surface connected to the nose R part inclined surface and downwardly inclined from the sub-cutting edge land part, and first and second protrusion parts are formed respectively, wherein the first protrusion part is connected to the main cutting edge land part and formed on the main cutting edge inclined surface at a portion at which the nose R part inclined surface ends, and the second protrusion part is connected to the sub-cutting edge land part and formed on the sub-cutting edge inclined surface at a portion at which the nose R part inclined surface ends, and no protrusion is present on the nose R part inclined surface.

In addition, it is characterized in that the first protrusion part and the second protrusion part have the same height as that of the main cutting edge land part and the sub-cutting edge land part.

In addition, it is characterized in that the plurality of troughs and the plurality of crests are alternately connected with each other on the upper surface bottom part, and the plurality of crests is sequentially lowered in height and at a smaller angle with a horizontal plane as being farther away from the sub-cutting edge.

In addition, it is characterized in that each of the plurality of crests has a gradually increasing height as going from the main cutting edge toward the fastening hole.

In addition, it is characterized in that the upper surface bottom part includes a nose R part bottom part connected to the nose R part inclined surface, and a cutting edge part bottom part including the plurality of troughs and the plurality of crests formed therein, and the nose R part bottom part is formed to be higher than the plurality of crests.

In addition, it is characterized in that the nose R part bottom part includes a first concave groove, and each of the plurality of crests includes a second concave groove at its end, and a radius of curvature of the first concave groove is greater than that of the second concave groove.

In addition, it is characterized in that the plurality of troughs has a greater width as being closer to the main cutting edge, and the plurality of troughs has a greater size of a relative width as being farther away from the nose R part.

In addition, it is characterized by including a boss part surrounding the fastening hole, in which the boss part includes a groove part having one end facing toward the sub-cutting edge and the other end facing toward the main cutting edge.

The cutting insert described above is mounted on a cutting tool of the present invention.

Effects of Invention

The cutting insert according to the embodiment of the present disclosure having the configuration described above has the following effects.

According to the present embodiment, the first and second protrusion parts in convex form connected to the land part are provided to prevent chips having high pressure from flowing toward the sub-cutting edge and also from pressing the sub-cutting edge with high pressure, thereby preventing the chips from being long stretched to the sub-cutting edge and thus preventing the shortening lifetime of the cutting insert due to the crater wear and plastic deformation.

In addition, the nose R part bottom part is placed higher than the cutting edge bottom part so that a bending direction of the chip is directed to the outside of the processing area, so as to make the curling radius of the chip relatively larger at the nose R part bottom part than at the cutting edge bottom part, and naturally orient the chips as a whole when curled. In addition, in order to prevent the chips from stretching, the protrusion part extends further upward as it is farther away from the main cutting edge so as to reduce the curling radius of the chips.

In addition, according to the present embodiment, the concave grooves having a predetermined radius of curvature are formed on a portion where the chips flow, so that the chips naturally flow and surface-contact the upper surface bottom part and therefore, local wear is prevented, and the processing load is reduced as the chips are curled while contacting three parts including the cutting edge, the inclined surface, and the upper surface bottom part (concave groove). In addition, long chips can be prevented by generating chip curling through the concave groove.

Meanwhile, it goes without saying that the present invention includes other effects, although not explicitly stated, that can be expected from the configuration described above.

BEST MODE FOR EMBODYING INVENTION

Hereinafter, preferred embodiments of the present disclosure will be described in detail with reference to the accompanying drawings, which will be readily apparent to those skilled in the art to which the present disclosure pertains. However, it will be understood that the present invention can be implemented in various other different forms and should not be construed as being limited to certain examples described herein.

Figure 1:
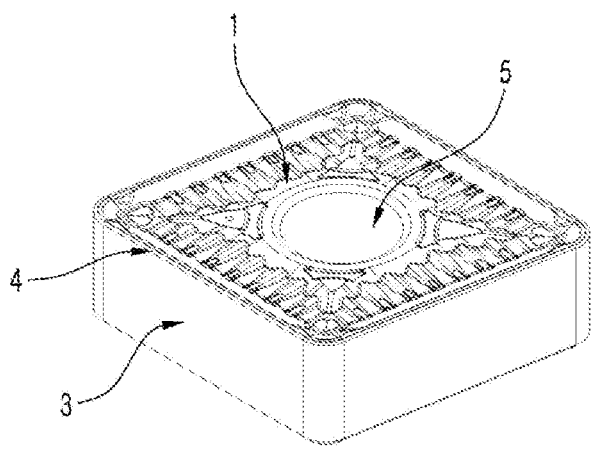
FIG. 1 is a perspective view of a cutting insert according to an embodiment of the present invention.
Figure 1:
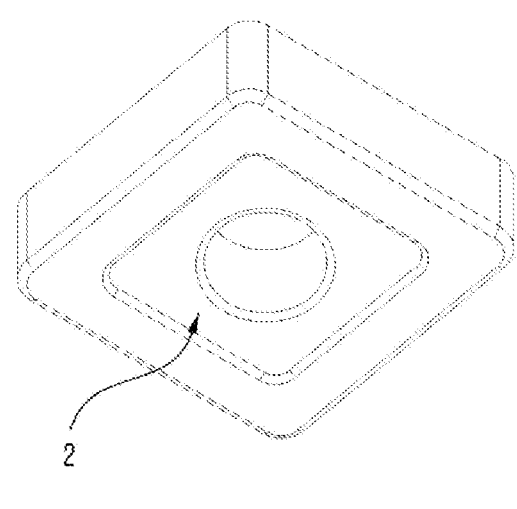
Figure 11:
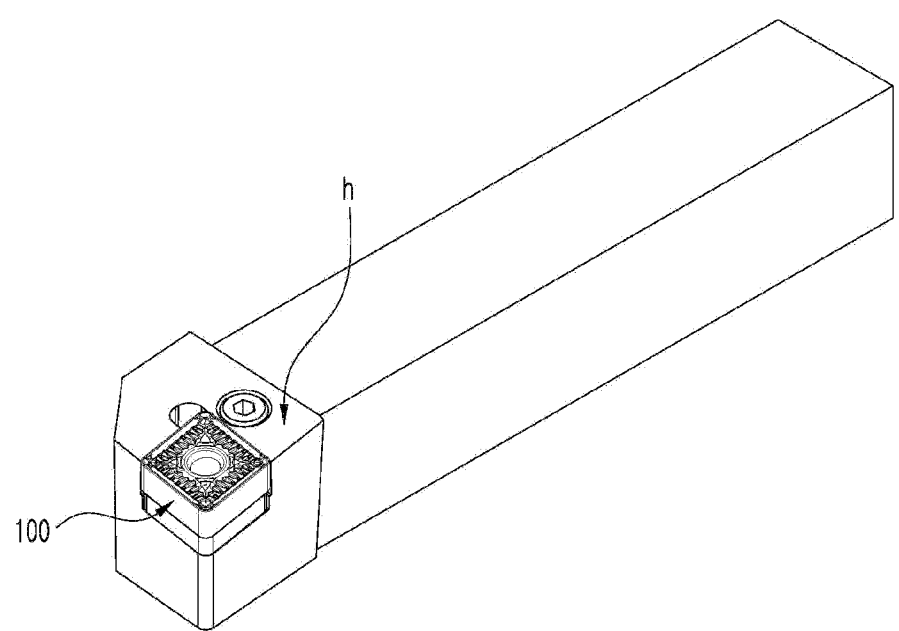
FIG. 11 is a view showing the cutting insert of FIG. 1 mounted on a cutting tool.
Figure 12:
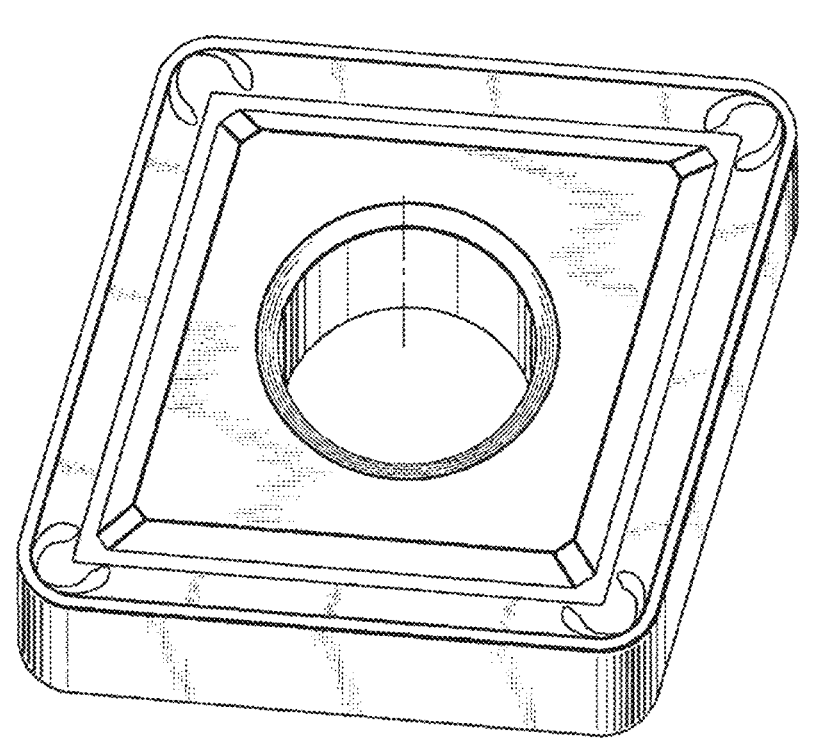
FIG. 12 illustrates prior art and is a view of a related cutting insert.

As shown in FIG. 1, the cutting insert according to an embodiment of the present invention includes an upper surface 1, a lower surface 2, a lateral surface 3, a cutting edge 4, and a fastening hole 5. For reference, this cutting insert may be a one-sided cutting insert for turning, in which the upper surface 1 is used as a cutting surface and the lower surface 2 is used as a mounting surface for the cutting tool. In addition, the cutting insert 100 may be fixed to the cutting tool H with a fastening bolt and used, as shown in FIG. 11.

Figure 2:
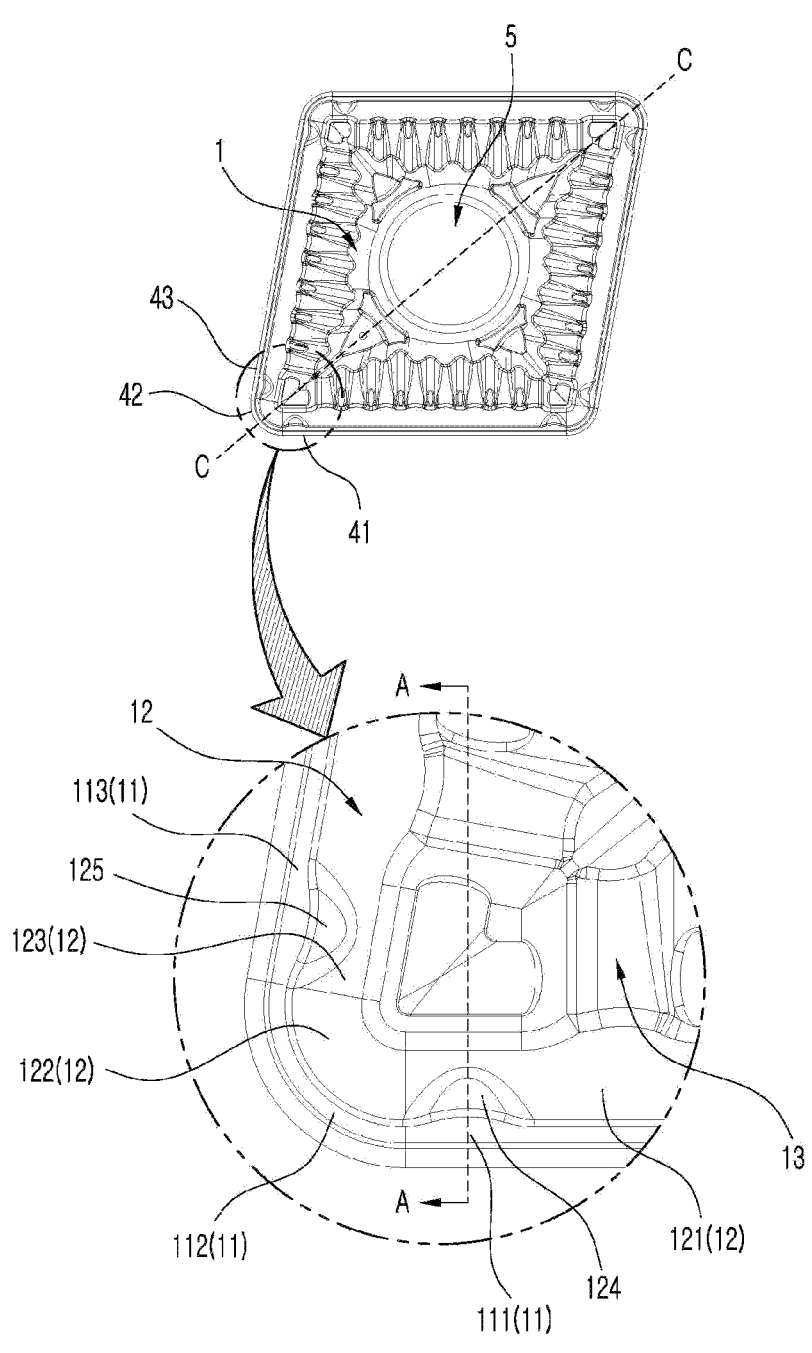
FIG. 2 is a plain view of the cutting insert of FIG. 1.

As shown in FIG. 2, the cutting insert may have an approximately parallelogram form, and may be symmetrical to each other with respect to a virtual center line C extending along the center of the fastening hole 5 and to the centers of the opposing corners.

As shown in FIG. 2, the cutting edge 4 includes a main cutting edge 41, a nose R part 42 connected to the main cutting edge 41, and a sub-cutting edge 43 connected to the nose R part 42.

The upper surface 1 includes a land part 11 adjacent to the cutting edge 4, an inclined surface (cutting surface) 12 downwardly inclined from the land part 11 (in a direction from the upper surface to the lower surface), and an upper surface bottom part 13 extending from the inclined surface 12.

Specifically, the land part 11 includes a main cutting edge land part 111 adjacent to the main cutting edge 41, and a nose R part land part 112 connected to the main cutting edge land part 111 and adjacent to the nose R part 42, and a sub-cutting edge land part 113 connected to the nose R part land part 112 and adjacent to the sub-cutting edge 43.

The inclined surface 12 includes a main cutting edge inclined surface 121 downwardly inclined from the main cutting edge land part 111, a nose R part inclined surface 122 connected to the main cutting edge inclined surface 121 and downwardly inclined from the nose R part land part 112, and a sub-cutting edge inclined surface 123 connected to the nose R part inclined surface 122 and downwardly inclined from the sub-cutting edge land part 113.

Specifically, according to this embodiment, as shown in FIG. 2, a first protrusion part 124, which is connected to the main cutting edge land part 111, is formed on the main cutting edge inclined surface 121 at a portion at which the nose R part inclined surface 122 ends, and a second protrusion part 125, which is connected to the sub-cutting edge land part 113, is formed on the sub-cutting edge inclined surface 123 at a portion at which the nose R part inclined surface 122 ends. In addition, no protrusion is present on the nose R part inclined surface 122.

Figure 3:
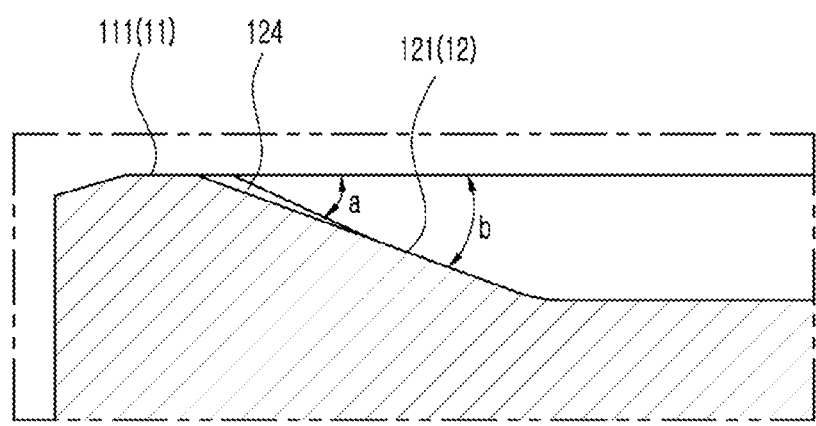
FIG. 3 (a) is a cross-sectional view taken in A-A direction of FIG. 2, and FIG. 3 (b) is a schematic view showing the chips flowing.
Figure 3:
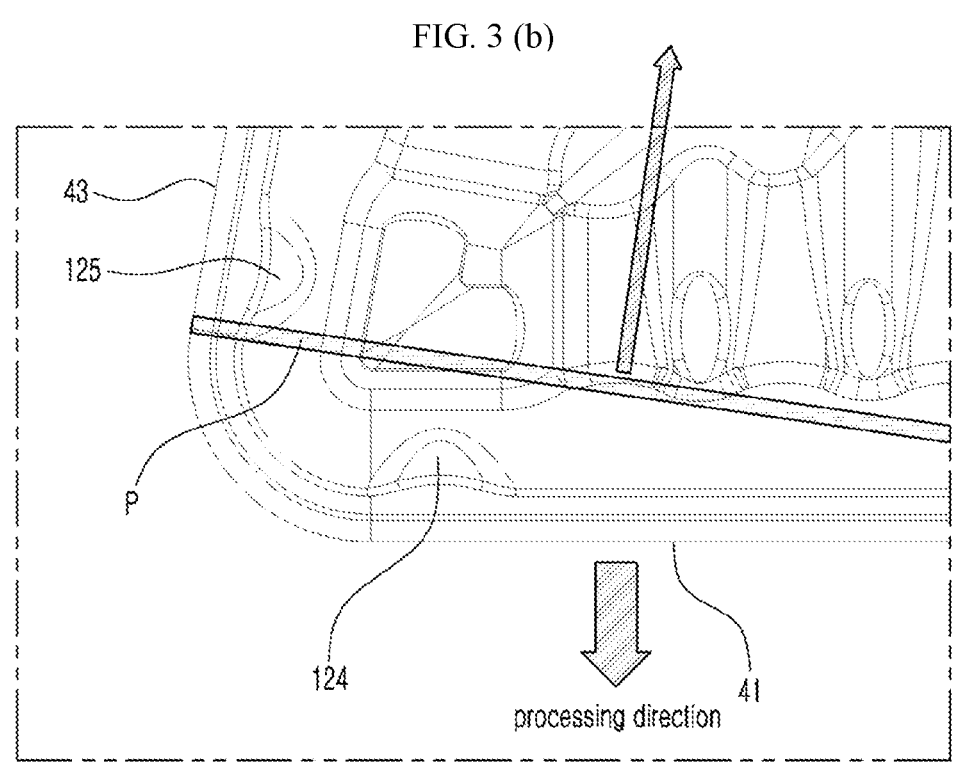

The first and second protrusion parts 124 and 125 are downwardly inclined by inclination A which is greater than a forward inclination angle B (see FIG. 3 (a)). In addition, the first protrusion part 124 and the second protrusion part 125 preferably have the same height as that of the main cutting edge land part 111 and the sub-cutting edge land part 113 (based on the lower surface), that is, the protrusion parts preferably have a height such that the protrusion parts do not protrude beyond the land parts.

For reference, chips generated when processing large workpieces generate high heat and high pressure, and if these can be effectively discharged, a longer lifetime of the cutting insert can be ensured. If the high-pressure chips continuously flow toward or press the sub-cutting edge, it causes a long crater wear and subsequently causes plastic deformation, resulting in damage to flank surface of the sub-cutting edge and shortened lifetime of the cutting insert. In order to prevent this, as shown in FIG. 3 (*b*), according to this embodiment, the first and second protrusion parts 124 and 125 in convex form connected to the land part 11 are provided to prevent chips (P) having high pressure from flowing toward the sub-cutting edge and also from pressing the sub-cutting edge with high pressure, thereby preventing the chips from being long stretched to the sub-cutting edge and thus preventing the shortening lifetime of the cutting insert due to the crater wear and plastic deformation.

Figure 4:
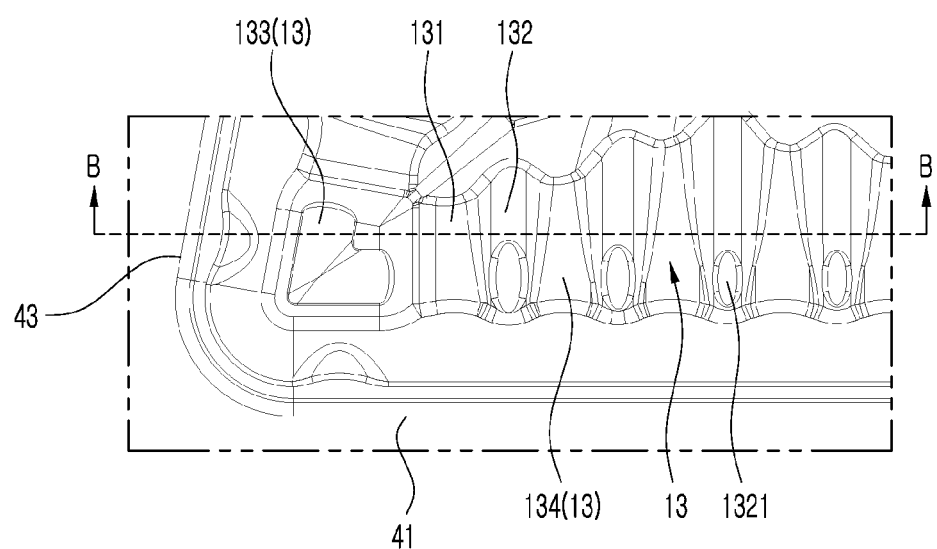
FIG. 4 (a) is a partially enlarged view of the cutting insert in FIG. 1, and FIG. 4 (b) is a cross-sectional view taken in B-B direction of FIG. 4 (a).
Figure 4:
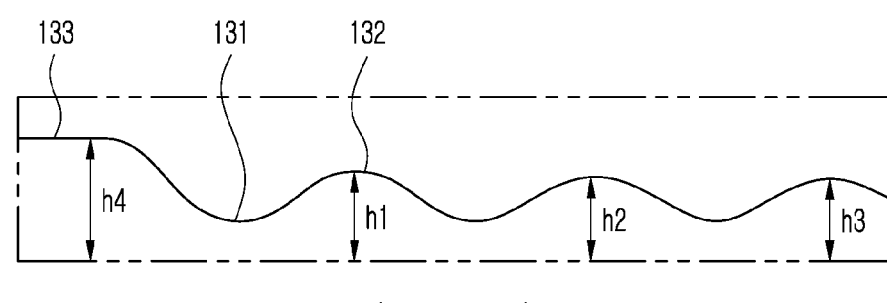
Figure 4:
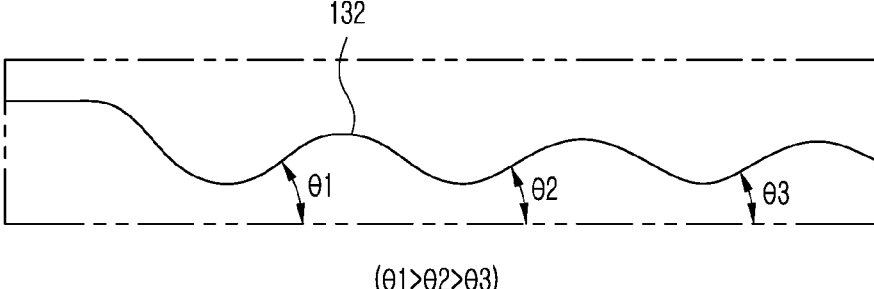
Figure 5:
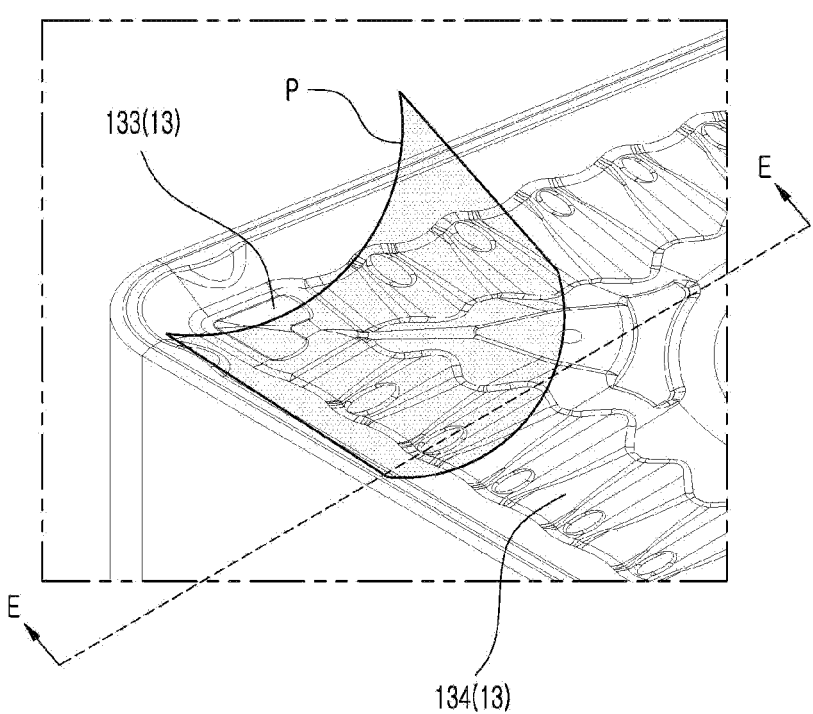
FIG. 5 is a partial perspective view of the cutting insert of FIG. 1 in the direction of a in nose R part and a main cutting edge.

Meanwhile, as shown in FIG. 4, according to this embodiment, a plurality of troughs 131 and a plurality of crests 132 are alternately connected with each other on the upper surface bottom part 13.

The plurality of crests 132 have a sequentially decreasing height (based on the horizontal plane, e.g., based on the lower surface) (h1>h2>h3) and a smaller angle with the horizontal plane (θ1>θ2>θ3) as being farther away from the sub-cutting edge 43.

Each of the plurality of crests 132 has a gradually increasing height as being closer to the fastening hole 5 from the main cutting edge 41. Likewise, the plurality of crests 132 positioned on the sub-cutting edge 43 side also has a gradually increasing height as being closer to the fastening hole 5.

In addition, the upper surface bottom part 13 includes a nose R part bottom part 133 connected to the nose R part inclined surface 122, and a cutting edge part bottom part 134 having a plurality of troughs 131 and a plurality of crests 132 formed therein. Further, the nose R part bottom part 133 is formed to have a height (h4) higher than the plurality of crests 132.

For reference, if chips generated during processing continue to stay in the processing area, high heat and high pressure are concentrated on the nose R part 42 of the cutting insert, resulting in rapid crater wear or plastic deformation in the cutting insert.

According to an embodiment, through the configuration described above, the nose R part bottom part 133 is placed to be higher than the cutting edge sub-bottom 134 so that a bending direction of the chip is directed to the outside of the processing area, and therefore, the curling radius of the chip on the nose R part bottom part 133 side is relatively greater than that on the cutting edge sub-bottom 134 side (R1>R2), and as a whole, the chips are naturally orientated when curled. In addition, in order to prevent the chips from stretching, the protrusion part 124 extends further upward as it is farther away from the main cutting edge 41 so as to reduce the curling radius of chips.

Figure 6:
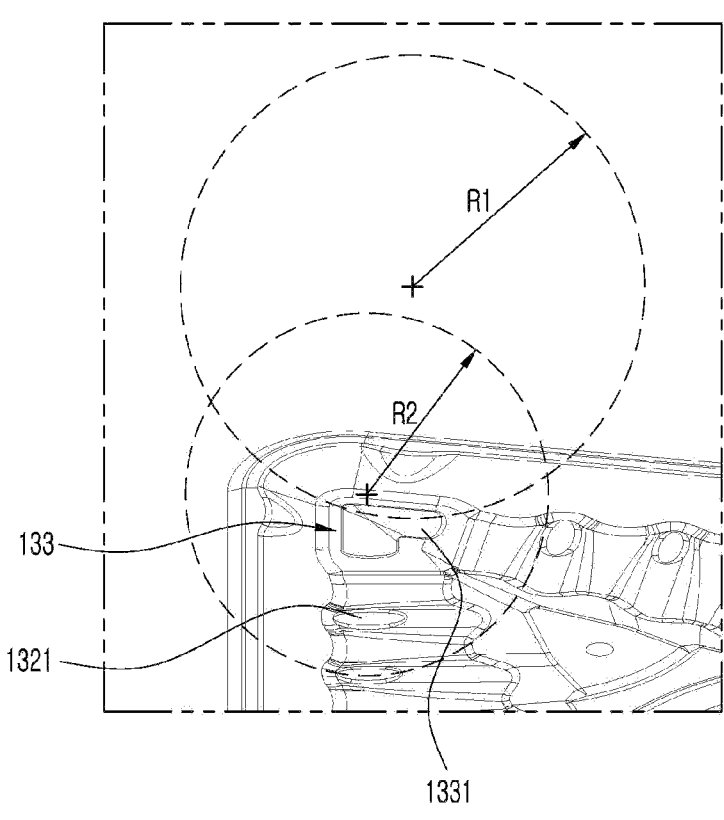
FIG. 6 is a view schematically showing the radius of curvature of a first concave groove and a second concave groove of the cutting insert in FIG. 1.

Meanwhile, as shown in FIG. 6, the nose R part bottom part 133 has a first concave groove 1331, and each of the plurality of crests 132 has a second concave groove 1321 at its end. In this example, the radius of curvature of the first concave groove 1331 is larger than that of the second concave groove 1321.

Figure 7:
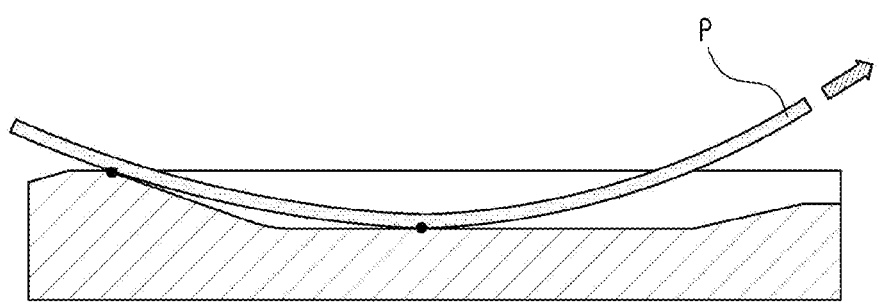
FIG. 7 (a) is a schematic view showing chip curling in a related cutting insert not provided with a second concave groove, and FIG. 7 (b) is a schematic view showing chip curling in the cutting insert of FIG. 1.
Figure 7:
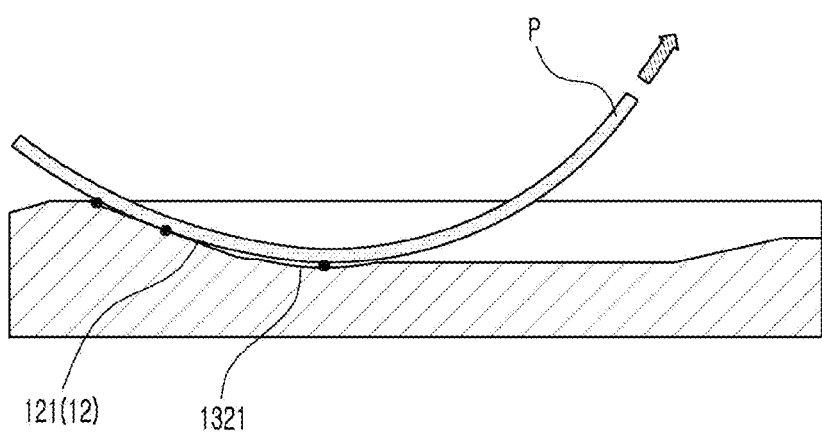

For reference, when the upper surface bottom part 13 (bottom part of a chip breaker) is flat, the chips may point-contact the upper surface bottom part 13 (see FIG. 7 (*a*)), and a local wear may occur at the point-contact area, where the stretched chips may be generated, increasing the processing load. In contrast, according to the embodiment, concave grooves 1331 and 1332 having a predetermined radius of curvature are formed on the portion where the chips flow, so that the chips naturally flow and surface-contact the upper surface bottom part 13 (see FIG. 7 (*b*)), and therefore, local wear is prevented, and the processing load is reduced as the chips are curled while contacting three parts including the cutting edge, the inclined surface, and the upper surface bottom part (concave groove). In addition, long chips can be prevented by generating chip curling through the concave groove.

Figure 8:
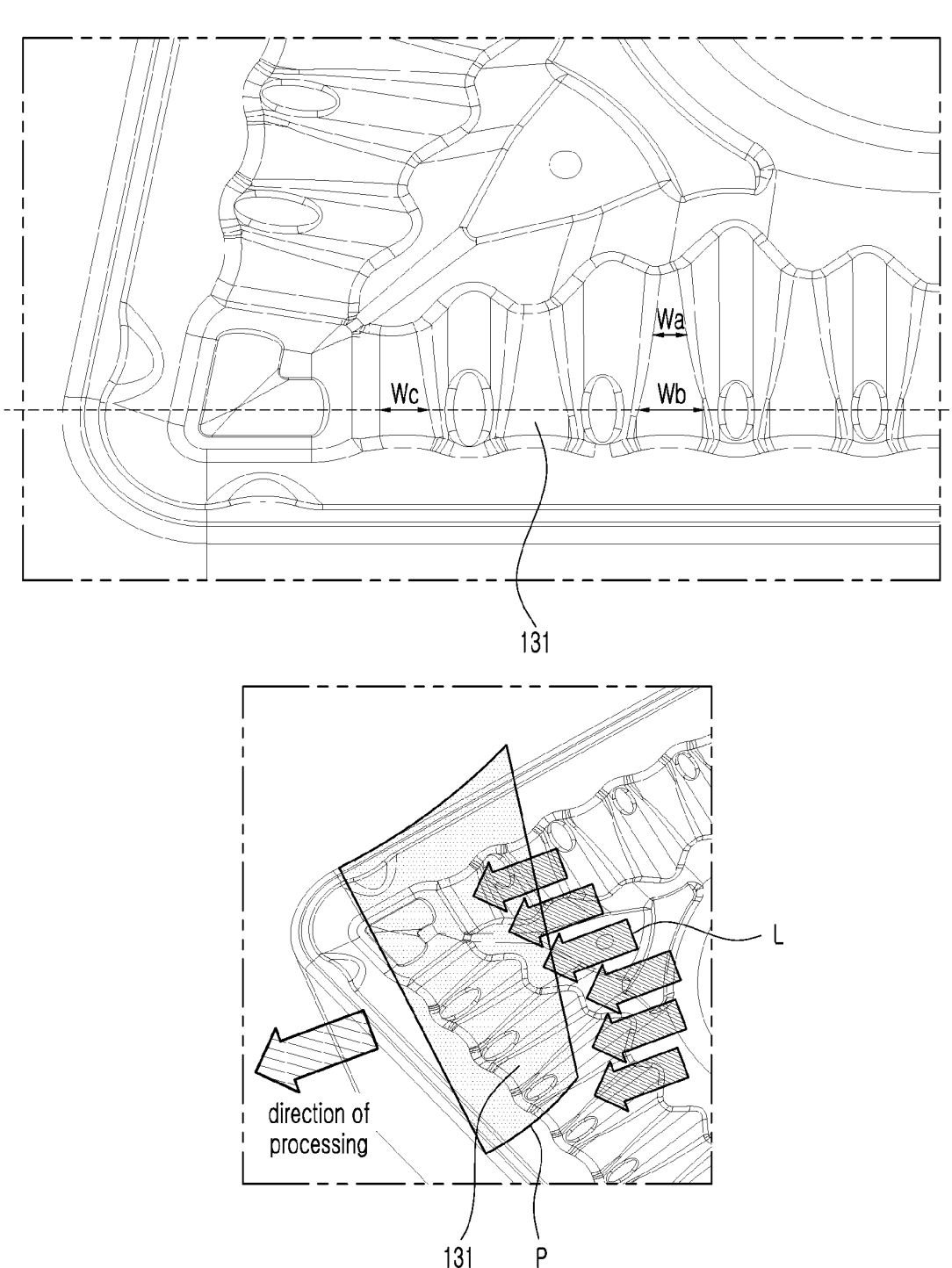
FIG. 8 is a view provided to explain a plurality of troughs of the cutting insert of FIG. 1.

As shown in FIG. 8, according to the embodiment, the width of the plurality of troughs 131 becomes greater as being closer to the main cutting edge 41 (Wb>Wa), and the relative width of the plurality of troughs 131 increases as being farther away from the nose R part 42 (Wb>Wc).

Through the configuration described above, it is possible to allow the cutting oil to sufficiently penetrate into the plurality of troughs 131 on the upper surface bottom part 13, and therefore, chips having high heat can be effectively cooled down, and the cutting heat is blocked from being transferred to the entire cutting insert. In addition, since the temperature of the cutting heat gradually rises as being closer to the cutting edge 4, the width of the troughs 131 may be formed to be greater as being closer to the cutting edge 4 so as to allow a larger amount of cutting oil to easily penetrate.

As described above, the cutting insert according to the embodiment basically prevents generation of high heat by quickly cooling the chips receiving high heat, and also helps chip curling because the bending stress is generated as the chips are cooled down. In addition, the cross section of the chip forms a wavy shape which is similar to the shape of the upper surface bottom part in the cutting insert, thus generating a bending stress and facilitating curling of the chips.

Figure 9:
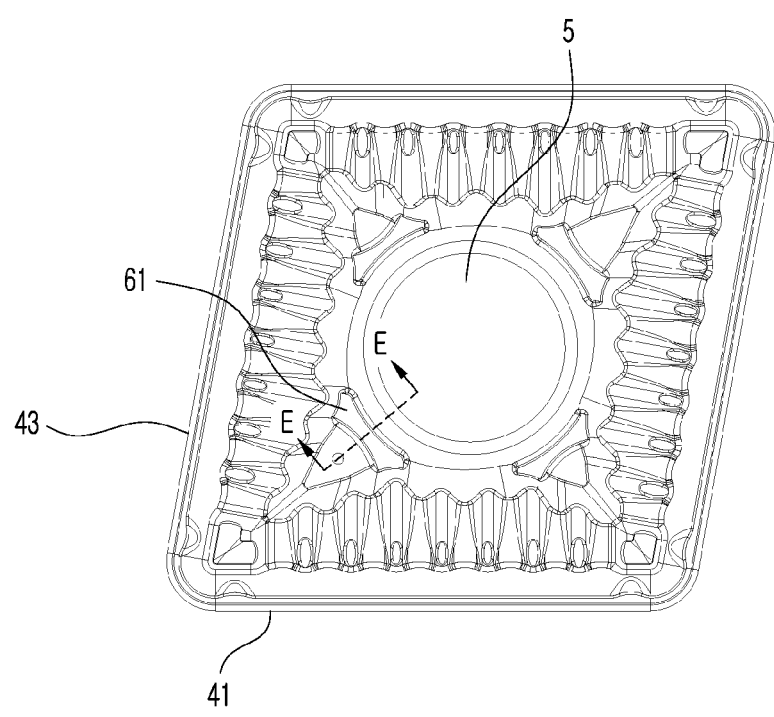
FIG. 9 is a view provided to explain a groove portion of the cutting insert of FIG. 1.
Figure 9:
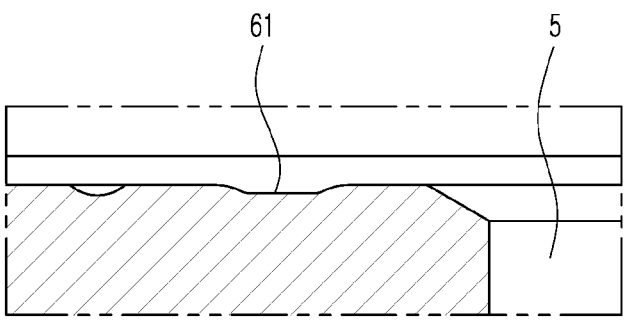
Figure 10:
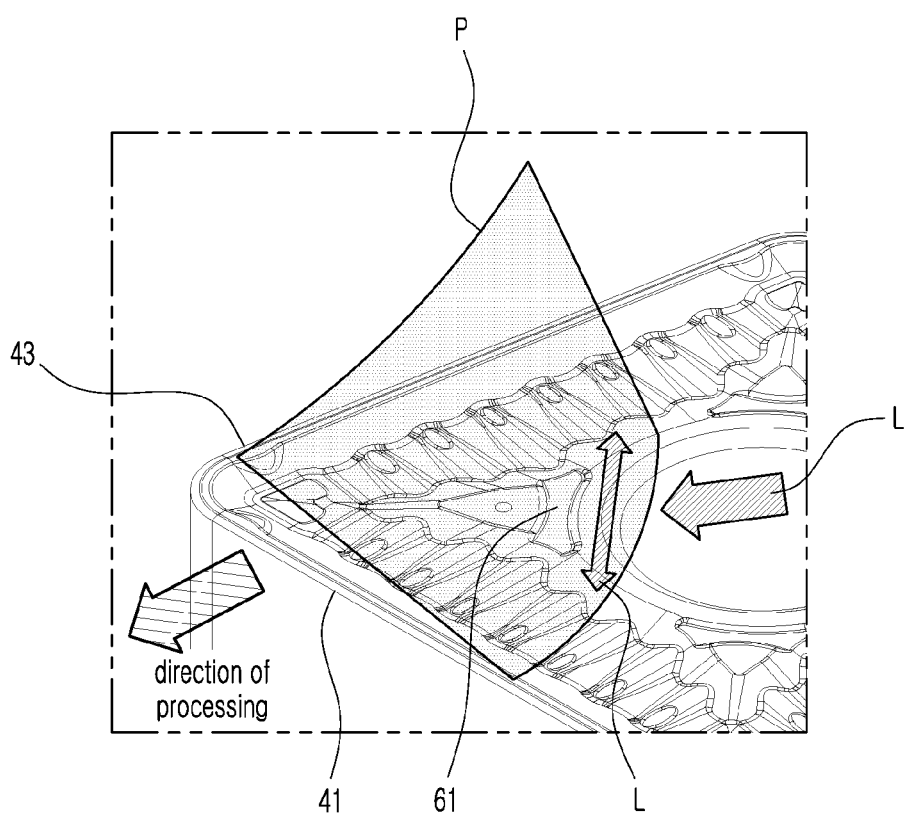
FIG. 10 is a schematic view showing cutting oil flowing through the groove portion of FIG. 9.

As shown in FIG. 9, the cutting insert has a boss part 6 surrounding the fastening hole 5. In addition, the boss part 6 includes a an elongate groove 61 formed therein, having one end facing the sub-cutting edge 43 and the other end facing the main cutting edge 41.

As shown in FIG. 8, the cutting insert can help relieve the cutting heat, by increasing contact area with the cutting oil (L) through the plurality of troughs 131 of the upper surface bottom part 13 when the cutting oil (L) is introduced from the outside. In addition, it allows the cutting oil (L), which is heated to a high temperature as it passes freely between the main cutting edge 41 and the sub-cutting edge 43 where the direct processing is performed, to be discharged toward the sub-cutting edge 43 and allows the cold cutting oil to be newly introduced into the processing portion, thereby preventing the generation of high cutting heat by the chips and also preventing the transfer of the cutting heat of the cutting insert.

Although the present invention has been described in connection with some examples herein, the present invention should not be limited to those examples only, and various other changes and modifications made by those skilled in the art from the basic concept of the disclosure are also within the scope of the claims appended herein.

INDUSTRIAL APPLICABILITY

The present invention is applicable for use in a cutting insert and a cutting tool on which the cutting insert is mounted.

The invention claimed is:

1. A cutting insert comprising an upper surface, a lower surface, a lateral surface, a cutting edge, and a fastening hole, wherein the cutting edge includes a main cutting edge, a nose R part connected to the main cutting edge, and a sub-cutting edge connected to the nose R part, the upper surface includes a land part adjacent to the cutting edge, an inclined surface downwardly inclined from the land part, and an upper surface bottom part extending from the inclined surface, the land part includes a main cutting edge land part adjacent to the main cutting edge, a nose R part land part connected to the main cutting edge land part and adjacent to the nose R part, and a sub-cutting edge land part connected to the nose R part land part and adjacent to the sub-cutting edge, the inclined surface includes a main cutting edge inclined surface downwardly inclined from the main cutting edge land part, a nose R part inclined surface connected to the main cutting edge inclined surface and downwardly inclined from the nose R part land part, and a sub-cutting edge inclined surface connected to the nose R part inclined surface and downwardly inclined from the sub-cutting edge land part, and first and second protrusion parts are formed respectively, wherein the first protrusion part is connected to the main cutting edge land part and formed on the main cutting edge inclined surface at a portion at which the nose R part inclined surface ends, and the second protrusion part is connected to the sub-cutting edge land part and formed on the sub-cutting edge inclined surface at a portion at which the nose R part inclined surface ends, and no protrusion is present on the nose R part inclined surface.

2. The cutting insert of claim 1, wherein the first protrusion part and the second protrusion part have the same height as that of the main cutting edge land part and the sub-cutting edge land part.

3. The cutting insert of claim 1, wherein a plurality of troughs and a plurality of crests are alternately connected with each other on the upper surface bottom part, and the plurality of crests is sequentially lowered in height and at a smaller angle with a horizontal plane as being farther away from the sub-cutting edge.

4. The cutting insert of claim 3, wherein each of the plurality of crests has a gradually increasing height as going from the main cutting edge toward the fastening hole.

5. The cutting insert of claim 1, wherein the upper surface bottom part includes a nose R part bottom part connected to the nose R part inclined surface, and a cutting edge part bottom part including the plurality of troughs and the plurality of crests formed therein, and the nose R part bottom part is formed to be higher than the plurality of crests.

6. The cutting insert of claim 5, wherein the nose R part bottom part includes a first concave groove, and each of the plurality of crests includes a second concave groove at its end, and a radius of curvature of the first concave groove is greater than that of the second concave groove.

7. The cutting insert of claim 3, wherein the plurality of troughs has a greater width as being closer to the main cutting edge, and the plurality of troughs has a greater size of a relative width as being farther away from the nose R part.

8. The cutting insert of claim 1, comprising a boss part surrounding the fastening hole, wherein the boss part includes a groove part having one end facing toward the sub-cutting edge and the other end facing toward the main cutting edge.

9. A cutting tool on which the cutting insert of claim 1 is mounted.

* * * * *